United States Patent
Durand et al.

(10) Patent No.: US 7,195,418 B2
(45) Date of Patent: Mar. 27, 2007

(54) DEVICE FOR JOINING COMPOSITE STRUCTURE ELEMENTS WITH METALLIC STRUCTURE ELEMENTS

(75) Inventors: Jean-Marc Durand, Levignac sur Save (FR); Bruno Sarpy, Fenouillet (FR); Gilles Bazerque, Quint-Fonsegrives (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 11/187,283

(22) Filed: Jul. 22, 2005

(65) Prior Publication Data

US 2006/0018710 A1    Jan. 26, 2006

(30) Foreign Application Priority Data

Jul. 22, 2004    (FR)    .................................. 04 51614

(51) Int. Cl.
*B64C 1/06* (2006.01)
*E04B 1/18* (2006.01)
(52) U.S. Cl. ..................................... 403/408.1; 403/217
(58) Field of Classification Search ................ 403/217, 403/219, 258, 260, 262, 408.1; 244/131, 244/117 R, 119, 123.1; 114/88
See application file for complete search history.

(56) References Cited

U.S. PATENT DOCUMENTS

| 3,499,622 | A | * | 3/1970 | Surcin et al. ................ 244/130 |
| 3,724,153 | A | * | 4/1973 | Wessells et al. ........ 296/203.03 |
| 4,760,493 | A | * | 7/1988 | Pearson ....................... 361/218 |
| 5,288,109 | A | * | 2/1994 | Auberon et al. .......... 285/222.4 |
| 5,467,570 | A | * | 11/1995 | Leek ............................ 52/712 |
| 5,499,782 | A | * | 3/1996 | Domine ....................... 244/1 A |
| 5,845,872 | A | * | 12/1998 | Pridham et al. ............. 244/1 A |
| 6,073,405 | A | * | 6/2000 | Kasai et al. ................... 52/283 |
| 6,311,449 | B1 | * | 11/2001 | Morse et al. .................. 52/702 |
| 6,314,630 | B1 | * | 11/2001 | Munk et al. .............. 29/407.01 |
| 6,766,984 | B1 | * | 7/2004 | Ochoa ......................... 244/119 |
| 2002/0053175 | A1 | * | 5/2002 | McKague et al. ....... 52/309.13 |
| 2002/0078545 | A1 | | 6/2002 | Munk et al. |

\* cited by examiner

*Primary Examiner*—Daniel P. Stodola
*Assistant Examiner*—Joshua T. Kennedy
(74) *Attorney, Agent, or Firm*—Patterson, Thuente, Skaar & Christensen, P.A.

(57) ABSTRACT

A device for joining, in particular, composite structure elements with metallic structure elements of an aircraft. The device includes a junction element, provided with a first longitudinal partition wall fastened to a metallic panel, integral with a stiffener comprising a vertical core and at least one baseplate, with a second longitudinal partition wall, fastened to a composite panel, and with a lower branch to which are connected the proximal extremities of the said first and second longitudinal partition walls. The device further includes a first fitting element, provided with a first pick-up fitting body on the said stiffener and with a first heel and a second fitting element, provided with a second pick-up fitting body on the composite panel, and with a second heel, the heels of the fitting elements being fastened to the lower branch, on both sides of the lower branch, opposite each other.

11 Claims, 3 Drawing Sheets

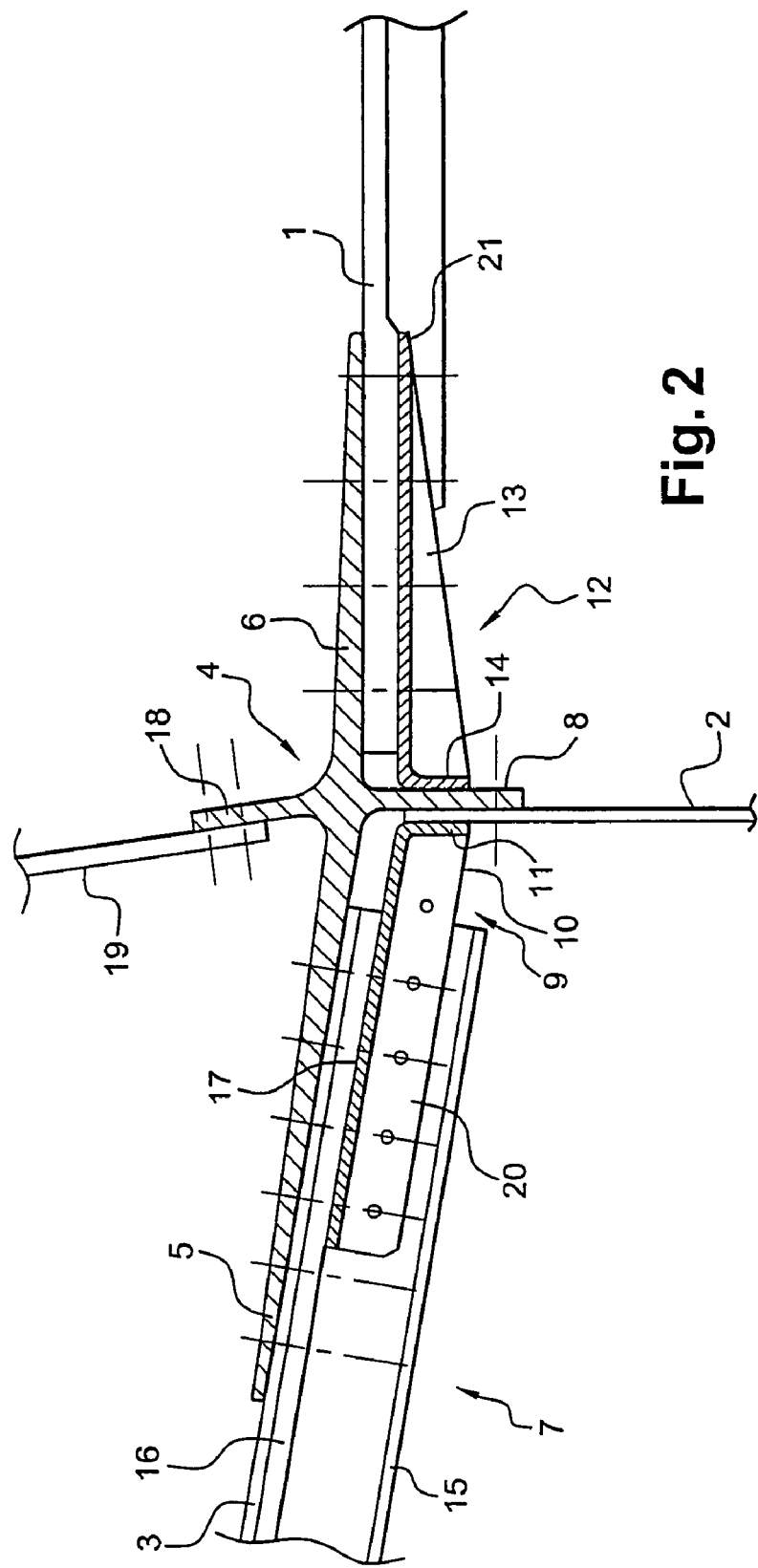

DEVICE FOR JOINING COMPOSITE STRUCTURE ELEMENTS WITH METALLIC STRUCTURE ELEMENTS

RELATED APPLICATION

This application claims priority to French Application No. 04 51614 filed Jul. 22, 2004.

TECHNICAL FIELD

This invention relates to a device for joining composite structure elements with metallic structure elements and proposes a device particularly applicable to producing a mixed junction of composite materials/metallic materials between the wings and the central box of an aircraft.

BACKGROUND ART

The connection of metallic wing elements to the metallic central box of the fuselage of an aircraft traditionally calls for cross-shaped or T-shaped junction elements provided with longitudinal branches, bolted onto the wing and the central box panels opposite each other, provided with a lower branch, onto which is bolted a rib, and, in the case of cross-shaped elements, with an upper branch onto which is bolted a higher fuselage panel.

The lower branch receives a rib from the central box upon which longitudinal compression fittings are supported opposite each other on the rib, each one of the fittings being bolted underneath a stiffener.

According to this design, the upper wing panels and central box panels are sandwiched between the longitudinal branches of the cross-shaped or T-shaped junction elements and the stiffeners, the latter being themselves fastened together through compression fittings. The compression stress that the wings exercise upon the central box being for the most part taken up by the cross-shaped or T-shaped element, the compression fittings, on account of their being distant from the panels, participate little in the taking up of the stress.

For this type of embodiment, the division of the stress is on the order of 75% in the cross type junction element and 25% in the fittings, which requires sizing the cross-shaped or T-shaped junction element in a consistent fashion.

In the case of an aircraft comprising traditional wings with metallic panels and stiffeners and a central box made of composite materials, the connection of the wings to the box is complex because the composite boxes are constructed by using panels with integrated composite stiffeners with a low stiffening rate and without a heel, and which therefore cannot be used as fastening points of compression fittings.

In addition, for aircraft with a large wingspan, the sizing of the junction element produced by die-forging becomes problematic, its weight becomes too considerable, the technology used reaches its limits in terms of acceptable flux level, and its manufacture becomes difficult.

SUMMARY OF THE INVENTION

This invention aims to create double-shearing junctions between panels of composite materials, like the construction panels of an aircraft central box, a central box rib, and one or more metallic elements, such as aircraft wing stiffeners and metallic panels, and to make it possible to better divide the stress between the cross-shaped junction element or the T-shaped junction element and between the fittings fastened to the lower rib, which has the advantage of reducing the mass of the cross-shaped or T-shaped element.

To do this, this invention mainly concerns a device for joining, in particular, composite structure elements with metallic structure elements of an aircraft, comprising a junction element provided with a first longitudinal partition wall fastened to a metallic panel, integral with a stiffener comprising a vertical core and at least one baseplate, a second longitudinal wall fastened to a composite panel, and a lower branch, to which are connected the proximal extremities of the said first and second longitudinal partition walls, characterized in that it comprises a first fitting element, provided with a first pick-up fitting body on the said stiffener and with a first heel, and, a second fitting element provided with a second pick-up fitting body on the composite panel and a second heel, the heels of the fitting elements being fastened to the lower branch, parallel to each other, on both sides of the lower branch.

More particularly, the first fitting body is fastened onto the stiffener by a rib joined to the vertical core of the metallic stiffener.

The device is, in particular, such that the first and second fitting bodies comprise means of fastening to the stiffener and the composite panel oriented according to different planes.

The device, according to the invention, making possible a tightened position of the fitting elements vis-à-vis the junction element, has the advantage of making possible a better taking-up of the compression stress transmitted by the metallic panel or the upper surface of the wing and by the composite panel of the upper part of the central box to the junction element.

It makes it possible, moreover, to compensate for the impossibility of fastening fitting elements on the side of the composite panel, on the stiffeners of this panel, and avoids having to add a strut between the fitting element and this panel.

Other characteristics and advantages of the invention emerge from the reading of the description that is going to be followed by a non-restrictive example of the embodiment of the invention with reference to the figures.

BRIEF DESCRIPTION OF THE DRAWINGS

FIG. 2 presents a front view of an embodiment of the device according to the invention;

DETAILED DESCRIPTION OF THE DRAWINGS

Figure 1A:
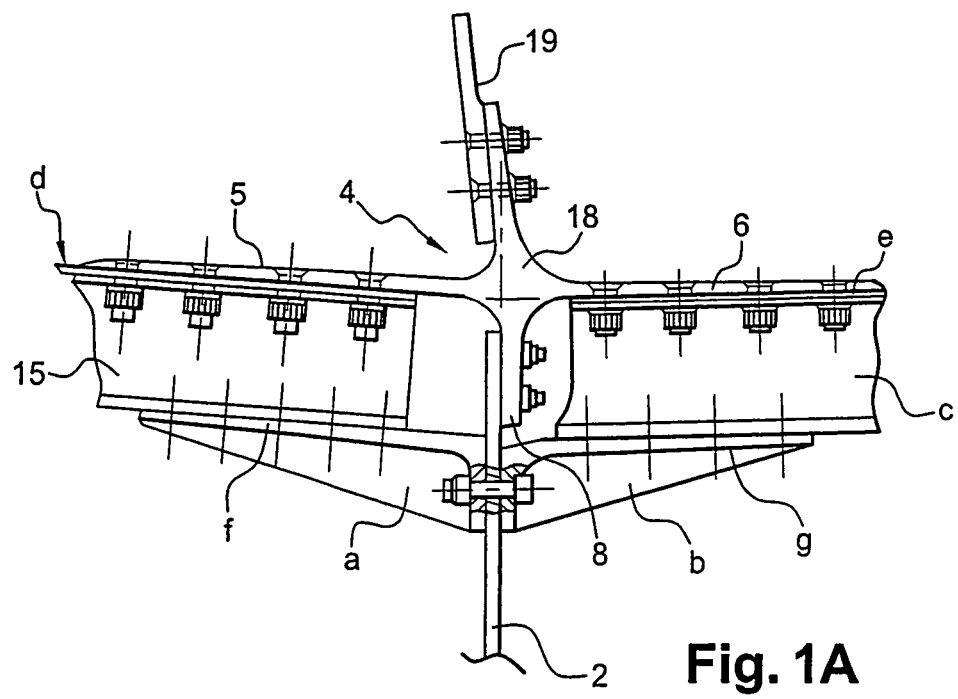
FIGS. 1A and 1B depict an example of a joining device of the prior art, seen respectively from the side and from below.
Figure 1B:
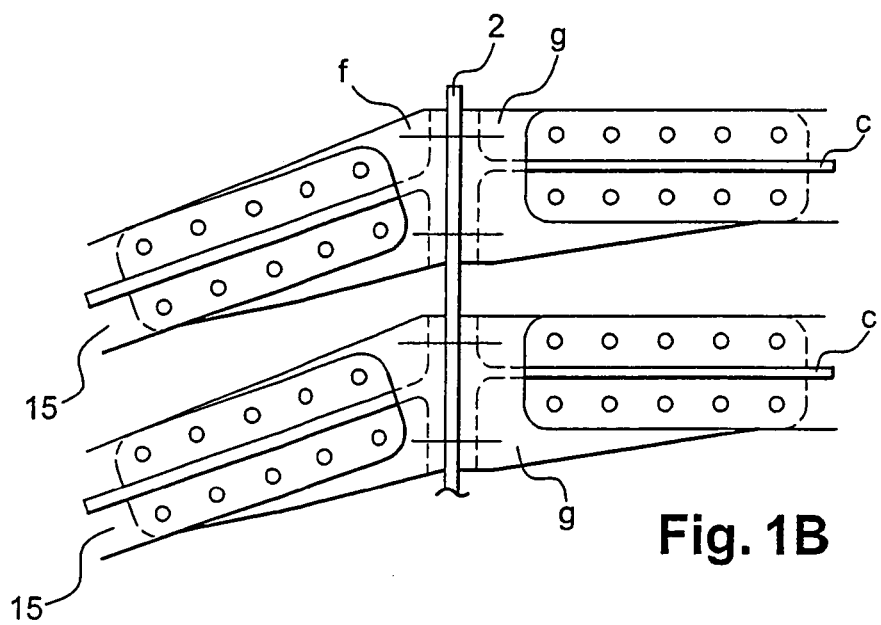

FIG. 1A, seen from the side, and FIG. 1B, seen from below, represent a device of the prior art making possible the joining of the upper surfaces of the wings of an airplane to the central fuselage box of this airplane onto which they are fastened. This device comprises a junction element 4, provided with partition walls 5, 6, with a lower branch 8, and with an upper branch 18, partition walls 5, 6 being bolted onto metallic panels d, e, the upper branch being bolted onto a part 19 of the fuselage, and the lower branch 8 being bolted onto a rib 2, separation element of the central box of the aircraft.

Such a device is found on each side of the central box for fastening the wings of the aircraft.

This device comprises fitting elements a,b at right angles fastened by their heel onto the lower rib 2, and each one is fastened by their web f, g to the lower baseplate of stiffeners 15,c of panels d,e.

According to this configuration, on the order of 75% of the compression stress due to the lift and transmitted by the wing panels d and the central box panel e is applied to the cross-shaped junction element. Because of their position at the top of the stiffener, the fitting elements take up on only on the order of 25% of this stress.

For an aircraft of considerable mass and of large wingspan, the sizing of the junction element produced by die-forging becomes problematic for high levels of flow, the capacities of the die-forged pieces being limited.

The device of this invention, represented from the front in FIG. 2 and in perspective with a view from below in FIG. 4, makes it possible in particular to re-balance the compression stress between the junction element and the fitting elements by bringing the fitting elements close to the upper surface of the wing and to the upper wall of the central box.

This device is particularly adapted to the connection by joining of composite structure elements, in particular the upper panel 1 and the rib 2 of a central box, with metallic structure elements, in particular an upper panel 3 of the aircraft's wing and a part of the fuselage 19.

The upper panel of the wing is integral with one or more stiffeners 7 directed toward the fuselage of the aircraft and comprising a vertical core 15 and at least one upper baseplate 16, on which the panel 3 rests.

Like the traditional junction element, the device according to the invention comprises a junction element 4, provided with a lower branch 8, with a first longitudinal partition wall 5, which rests on the metallic panel 3 and is fastened to the metallic panel 3, and a second longitudinal partition wall 6 fastened to and resting on a central box panel, here a composite panel 1.

The proximal extremities of the said first and second longitudinal partition walls 5, 6 are connected to the lower branch 8 of the junction element.

The device according to the invention comprises, moreover, a first fitting element 9, provided with a first pick-up fitting body 10 on the said stiffener 7, and with a first heel 11, and a second fitting element 12, provided with a second pick-up fitting body 13 on the composite panel 1, and with a second heel 14.

The fitting bodies comprise a web 17, 21 and a rib 20 connecting the web 17, 21 to the heel 11, 14 of the fitting elements 9, 12.

According to the invention, the heels 11, 14 of the fitting elements are fastened parallel to each other to the lower branch 8 of the junction element 4, on both sides of the lower branch 8.

A first advantage of the device according to the invention is to balance the stress on the lower branch of the cross and to bring the fitting elements closer to the cross's partition walls to balance the stress applied to the cross and the fittings.

Figure 3A:
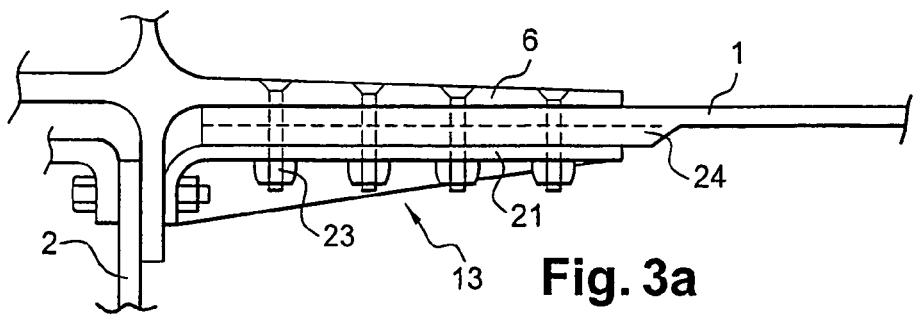
FIG. 3 is a detailed depiction of FIG. 2.
Figure 3B:
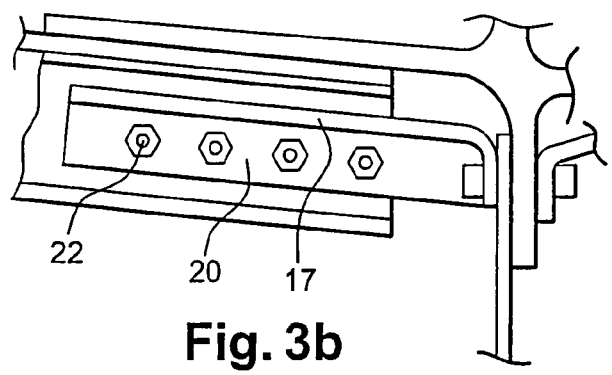

As represented in particular in FIG. 3b, to take up the stress coming from the wing, the first fitting body is fastened by its rib 20 onto the vertical core 15 of the stiffener 7, with the help of bolts 22.

From the side of the central box, the second fitting body 13 comprises a web, 21, fastened onto an interior surface of the composite panel 1, as represented in FIG. 3a.

Figure 4:
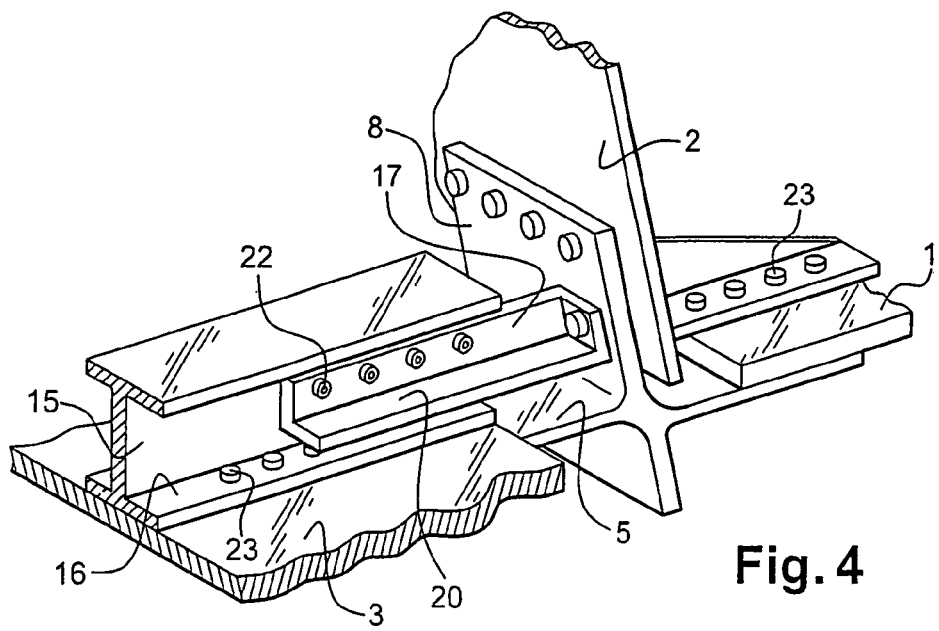
FIG. 4 is a perspective view of the device depicted in FIG. 2 from the side of the metallic panel.

Thus, the first longitudinal partition wall 5 is fastened onto the upper surface of the panel 3, the second longitudinal partition wall 6 is fastened onto the upper surface of the composite panel 1, the first fitting element 9 onto the core of the stiffener 7, and the second fitting element 12 under the composite panel 1, the first and second fitting bodies 10, 13 comprising means of fastening 22, 23 to the said stiffener 7 and composite panel 1, oriented according to perpendicular directions, as represented in FIG. 4.

In addition, to improve the fastening of the composite panel, the second partition wall 6 and the web 21 are joined together on each side of the composite panel 1. Thus the composite panel is sandwiched between the second partition wall 6 of the junction element and the web 21 of the second fitting element.

The composite panel 1 comprises an additional thickness 24 in the stress field between the second fitting element and the web of the junction element. This additional thickness can be found on one side or the other of the panel 1.

As in the device of the prior art, the lower branch 8 of the junction element 4 receives a lower rib 2 from a central box of the aircraft. However, according to the invention and with reference to FIG. 3b, to take up even better the stress at the level of the junction element, the heels 11, 14 of the fitting elements 9, 12 are bolted together onto the lower rib 2 and onto the lower branch 8, the latter being thus squeezed together by the fitting elements 9, 12.

The junction element 4 according to the example is an element in the shape of a cross and comprises an upper branch 18 onto which is bolted a fuselage panel 19 of the aircraft, which makes it possible to complete the link between the box, the fuselage, and the wings.

Thus, the fittings brought closer to the partition walls of the junction element participate for at least 40% in the taking up of the compression stress, the device thus making possible the transmission of a flow of compression on the order of 1000 daN/mm, the device having, moreover, a total weight less than that of a device of the same capacity of the prior design.

All of the joints between the elements are achieved by boltings 21, 22 and 23.

The invention is not limited to the example represented and in particular it can be applied in inverted form to the lower surface of the wings.

The invention claimed is:

1. A joining assembly, comprising:
   a junction element including:
      a first longitudinal partition wall fastened to a metallic panel, the metallic panel integral with a stiffener and comprising a vertical core and at least one baseplate,
      a second longitudinal partition wall fastened to a composite panel, and
      a lower branch coupled to a proximal portion of an extension of each of the first and second longitudinal partition walls;
   a first fitting element including a first strain relief body fitting fastened to the stiffener and having a first heel; and
   a second fitting element including a second strain relief body fitting on the composite panel and having a second heel,
      wherein the first and second heels of the first and second fitting elements, respectively, are fastened to opposing sides of the lower branch of the junction element, wherein a lower rib is disposed directly adjacent the lower branch and interposed between one of the first and second heels and the lower branch, and wherein the lower rib, the lower branch, and the first and second heels are fastened together by a fastener that passes through the lower rib, the lower branch, and the first and second heels, thereby reducing compression stress on the junction element.

2. A joining assembly according to claim 1, wherein the first and second strain relief body fittings comprise means for fastening the metallic stiffener and composite panel oriented on different planes.

3. A joining assembly according to claim 1, wherein the first strain relief body fitting is fastened onto the stiffener by a rib joined to the vertical core of the stiffener.

4. A joining assembly according to claim 1, wherein the first longitudinal partition wall is fastened onto an upper surface of the metallic panel and the second longitudinal partition wall is fastened onto an upper surface of the composite panel.

5. A joining assembly according to claim 1, wherein the second strain relief body fitting comprises a web fastened onto a lower surface of the composite panel.

6. A joining assembly according to claim 5, wherein the second longitudinal partition wall and the web are joined together to the composite panel.

7. A joining assembly according to claim 1, wherein the first and second heels of the first and second fitting elements are bolted onto the lower rib and the lower branch.

8. A joining assembly according to claim 1, wherein the junction element has a cross shape and comprises an upper branch bolted to a fuselage panel of the aircraft.

9. A joining assembly according to claim 1, wherein the composite panel comprises an additional thickness in a stress field.

10. A joining assembly according to claim 1, wherein the junction element comprises an upper branch bolted to a fuselage panel of the aircraft, wherein the junction element provides a junction between the fuselage panel and the lower rib and completes a link between the central box, the fuselage panel, and a wing of the aircraft, and wherein the first and second fitting elements, the central box, the fuselage panel, and the wing are each attached to the junction element.

11. A joining assembly according to claim 1, wherein at least one pair of the first and second fitting elements and the first and second longitudinal partition walls sandwich one of the composite panel and the metallic panel.

* * * * *